United States Patent
Pfau

(10) Patent No.: US 7,578,037 B2
(45) Date of Patent: Aug. 25, 2009

(54) METHOD FOR FIXING A TOOL IN A DEFINED AXIAL POSITION

(75) Inventor: Christian Pfau, Bietigheim-Bissingen (DE)

(73) Assignee: E. Zoller GmbH & Co., KG Einstell-und Messgeräte, Freiberg/Neckar (DE)

( * ) Notice: Subject to any disclaimer, the term of this patent is extended or adjusted under 35 U.S.C. 154(b) by 667 days.

(21) Appl. No.: 10/536,196

(22) PCT Filed: Dec. 3, 2003

(86) PCT No.: PCT/EP03/13651

§ 371 (c)(1), (2), (4) Date: May 24, 2005

(87) PCT Pub. No.: WO2004/052593

PCT Pub. Date: Jun. 24, 2004

(65) Prior Publication Data

US 2006/0048368 A1 Mar. 9, 2006

(30) Foreign Application Priority Data

Dec. 7, 2002 (DE) .................. 102 57 226

(51) Int. Cl.
*B23P 11/02* (2006.01)
*F16B 4/00* (2006.01)
*B23Q 17/22* (2006.01)
*B23B 31/08* (2006.01)

(52) U.S. Cl. .............. 29/407.01; 29/407.04; 29/407.05; 29/407.1; 29/447; 403/273; 33/639; 409/218; 279/145; 279/156

(58) Field of Classification Search ............ 29/407.01, 29/407.04, 407.05, 407.09, 407.1, 700, 703, 29/711, 712, 718, 720, 721, 281.1, 33 R, 29/447; 403/273; 33/639; 409/218; 279/145, 279/156

See application file for complete search history.

(56) References Cited

U.S. PATENT DOCUMENTS 5,035,556 A   7/1991   Gaquere et al.

(Continued)

FOREIGN PATENT DOCUMENTS

DE    198 36 912    2/2000

(Continued)

OTHER PUBLICATIONS

Office Action dated Dec. 4, 2003 in corresponding German patent application No. 102 57 226.7.

(Continued)

*Primary Examiner*—Jermie E Cozart
(74) *Attorney, Agent, or Firm*—Posz Law Group, PLC

(57) ABSTRACT

The invention relates to a method for fixing a tool (10, 22, 64), especially a shaft tool, in a clamping chuck (8, 18, 60), whereby the tool (10, 22, 64) is introduced into the clamping chuck (8, 18, 60) and fixed therein (8, 18, 60) upon reaching an axial nominal position. According to the invention, the tool (10, 22, 64) is brought against an abutment (42, 70) and the position of a characteristic element of the tool (10, 22, 64) is measured. The tool (10, 22, 64) is positioned in the axial nominal position by moving the abutment (42, 70) along a positioning section ($Z_1$) calculated from the measurement.

15 Claims, 3 Drawing Sheets

U.S. PATENT DOCUMENTS

| | | | |
|---|---|---|---|
| 5,403,132 A * | 4/1995 | Truesdell | 409/131 |
| 6,216,335 B1 * | 4/2001 | Freyermuth | 29/701 |
| 6,629,480 B1 | 10/2003 | Freyermuth et al. | |
| 6,722,008 B2 * | 4/2004 | Flick | 29/281.5 |
| 6,796,050 B2 * | 9/2004 | Haimer et al. | 33/636 |
| 2001/0042295 A1 | 11/2001 | Voss et al. | |
| 2003/0041434 A1 * | 3/2003 | Flick | 29/407.05 |
| 2003/0088972 A1 * | 5/2003 | Haimer | 29/700 |
| 2003/0193148 A1 | 10/2003 | Haag et al. | |

FOREIGN PATENT DOCUMENTS

| | | |
|---|---|---|
| DE | 19927496 | 12/2000 |
| DE | 100 15 322 | 10/2001 |
| DE | 100 24 423 | 11/2001 |
| DE | 10138107 | 2/2003 |
| DE | 600 19 067 | 2/2006 |
| EP | 1 103 338 | 11/2000 |
| EP | 1 155 765 | 4/2001 |
| WO | WO 99/07505 | 2/1999 |
| WO | WO 03106105 | 12/2003 |

OTHER PUBLICATIONS

Office Action dated Apr. 16, 2004 in corresponding PCT patent application NO. PCT/EP03/13651.

Office Action dated Feb. 2, 2008 in corresponding European patent application No. 03767733.3-2302.

Office Actions dated Apr. 4, 2007 in corresponding European patent application No. 1 525 072.

Die Kelch-Schrumpftechnik, *The Shrinking technique—for an excellent connection of tools*, Kelch, pp. 2-12.

Die Kelch-Schrumpftechnik, *The Shrinking technique-very cool: hot shrink fitted tools*, Kelch, Feb. 1997.

Die Kelch-Schrumpftechnik, *The Shrinking technique—The program for reamer for a very precise adjustment*, Jan. 2000.

Die Kelch-Schrumpftechnik, *The Shrinking technique—Index of contents,*, pp. 1-11.

Die Kelch-Schrumpftechnik, *The Shrinking technique—device for measuring lengths and adjustment of lengths*.

Werkzeugaufnahmen, *Tool receptacles*, SK30-40-45-50, DIN 69 871 Teil 1, pp. 9-10.

Die Kelch-Schrumpftechnik, *The Shrinking technique—for an excellent connection of tools*, Kelch, Aug. 1997, pp. 2-12.

Die Kelch-Schrumpftechnik, *The Shrinking technique—very cool: hot shrink fitted tools*, Kelch, Feb. 1997.

Die Kelch-Schrumpftechnik, *The Shrinking technique-device for measuring lengths and adjustment of lengths*, Feb. 2001.

Werkzeugaufnahmen, *Tool receptacles*, SK30-40-45-60, DIN 69 871 Teil 1, Jan. 1999, pp. 9-10.

* cited by examiner

METHOD FOR FIXING A TOOL IN A DEFINED AXIAL POSITION

BACKGROUND OF THE INVENTION

The invention relates to a method for fixing a tool, in particular a shank-type tool, in a tool chuck, in which the tool is inserted into the tool chuck and is fixed in the tool chuck when an axial desired position is reached.

DE 100 24 423 A1 discloses a method for frictionally clamping a tool in place with its shank in a tool chuck, in which method the tool is pressed into the tool chuck against a counterforce and is frictionally fixed in the tool chuck by shrink fitting when an axial desired position is reached. The desired position is predetermined by a stop, striking which is an arm which holds the tool during the insertion into the tool chuck. The position of the stop and of the arm is set after the tool has been measured for its position relative to the tool chuck.

SUMMARY OF THE INVENTION

The object of the present invention is in particular to specify a method for fixing a tool, in which the tool can be fixed in an axial desired position in the tool chuck with very high accuracy.

The invention is based on a method for fixing a tool, in particular a shank-type tool, in a tool chuck, in which the tool is inserted into the tool chuck and is fixed in the tool chuck when an axial desired position is reached.

It is proposed that the tool be brought with its shank against a stop and that a characteristic element of the tool be measured for its position, and that the tool be positioned in the axial desired position by a movement of the stop by a positioning distance calculated from the measurement.

The invention permits very accurate positioning of the tool in an axial desired position in the tool chuck, since error sources associated with the stop can be avoided. When the desired position of the stop is being determined, the position of the stop before the movement of the stop is taken into account. The tool can be measured in the state bearing against the stop and can then be moved into the desired position. The final actual position is therefore independent of mechanical error sources, such as, for example, a stop not set exactly before the insertion, a contaminated stop surface or imprecise seating of the tool on the stop. For example, dirt located between the stop and a tool leads to "incorrect positioning", which enters into both the measuring of the characteristic element and the positioning of the tool in the axial desired position. The error stands out and the desired position of the tool in the tool chuck is independent of the quality of the connection between stop and tool. The tool can be positioned in the axial desired position in such a way that the characteristic element of the tool is positioned at a desired distance from a reference point.

The tool is positioned in the axial desired position by a movement of the stop by a positioning distance calculated from the measurement. The tool is therefore directed into the desired position by the movement of the stop. With its movement, the stop predetermines the movement of the tool. The shank of the tool refers to that region of the tool which is inserted into the tool chuck. Compared with the tip of the tool, the shank is insensitive to a stop, for which reason a stop can be struck there without any problems.

The tool is advantageously first of all inserted into the tool chuck, expediently directly into a locating bore in which the tool is subsequently fixed, and is brought against the stop after the insertion. In this way, subsequent release of the tool from the stop, for example by the tool butting against the tool chuck, can be countered. In addition, manual insertion of the tool into the tool chuck is facilitated, since the tool can be inserted into a locating bore of the tool chuck.

The bringing of the tool against a stop can be effected by a movement of the tool against the static stop or a movement of the stop against the static tool or also by tool and stop being moved toward one another.

The tool is expediently pressed against the stop by gravitation. The tool is pressed by its weight against the stop arranged below the tool, so that the connection between tool and stop is retained even during a movement of the stop. Additional retention for positioning the tool at the stop can be dispensed with.

In an advantageous configuration of the invention, the tool is moved out of the tool chuck by the movement of the stop. The movement of the stop is opposed to the direction in which the tool has been inserted into the tool chuck, and if need be is also opposed to the gravitation, which presses the tool against the stop. Release of the tool from the stop, for example by jamming of the tool in the tool chuck, can therefore be effectively avoided.

The actual distance of the characteristic element from a reference point is advantageously determined, and the positioning distance is calculated from the difference between the actual distance and a desired distance. The reference point can be used as coordinate origin for measurements and the positioning. The positioning distance can be determined in a simple manner by forming the difference between the actual distance and the desired distance of the characteristic element from the reference point.

The tool cutting lip is a decisive element of the tool for a subsequent machining operation. A tool cutting lip therefore expediently serves as a characteristic element of the tool. It is also possible for only one contour unit, for example a tip of the tool cutting lip, to be used as characteristic element.

Especially stable retention of the tool in the tool chuck is achieved if a retaining stop supported in the tool chuck is brought against the tool brought into the desired position. During a subsequent production operation, the tool machines a workpiece and is subjected to high forces in the process. These forces press the tool, inter alia, into the tool chuck. A retaining stop which is supported in the tool chuck and also bears against the tool during the production operation keeps the tool supported in the tool chuck in the axial direction. To support the retaining stop in the tool chuck, both the retaining stop and the tool chuck can each be provided with a thread, the connection of these threads holding the retaining stop in the tool chuck. The retaining stop is arranged, for example, in a locating bore of the tool chuck for the tool. It is also possible to arrange the retaining stop in a bore provided separately for the retaining stop. To bring the stop against the tool, the tool can first be brought into its desired position and fixed there, and then the retaining stop can be set for light contact with the tool. The setting may be effected manually, for example by a hexagon key, by means of which the second stop is turned in the thread. It is also possible to set the retaining stop mechanically or even automatically.

A tool chuck for implementing an embodiment of the abovementioned method has a tool-locating bore and a stop bore which communicates with the tool-locating bore and is intended for passing through a translationally movable first stop. According to the invention, the tool chuck comprises a supporting means on which a retaining stop is supported, the retaining stop having a passage for passing through the stop. With such a tool chuck, very accurate and quick and, in particular, also full-automatic positioning of the tool in the tool chuck can be achieved, displacement of the tool inside the tool chuck being prevented to a special degree by the retaining stop. The supporting means used may be an internal thread.

The tool is expediently shrunk in place in the tool after reaching the desired position. This ensures a firm frictional connection between the tool and the tool chuck.

The tool is set in an axial desired position in a highly accurate manner while at the same time being firmly retained in the tool chuck by the tool being inserted, pre-positioned and shrunk in place in the tool chuck and by it being loosened again before the movement of the stop by the positioning distance. When the tool is being shrunk in place in a shrink fit chuck, there is only a little time during which the tool can be reliably moved in the tool chuck. Since the characteristic element is measured when the tool is located in the tool chuck, this may be done either with a fast measuring device in the hot tool chuck or also with a slower measuring operation when the tool chuck is already cooled. The positioning in the desired position can be carried out by the tool chuck being heated again after the measuring, so that it expands and the tool bearing against the stop is loosened again. The stop is then moved by the positioning distance, so that the tool is brought into the axial desired position. The tool chuck is then cooled again, so that it contracts and firmly holds the tool in such a way that it is shrunk in place in the tool chuck. The tool can be pre-positioned in the tool chuck by the tool being measured, for example, outside the tool chuck, by then being inserted into the hot tool chuck up to a calculated pre-position and by then being shrunk in place by cooling of the tool chuck. The pre-positioning in the tool chuck can be effected by the stop or another aid. The tool is then measured again, the measured values obtained from the second measurement serving to calculate the positioning distance. During this measuring operation, the stop need not necessarily bear against the tool.

Especially speedy pre-positioning of the tool in the heated tool chuck is achieved by the characteristic element, before the insertion of the tool, being measured for its position relative to a stop point at the tool, and by the stop being moved by a positioning distance, calculated from the measurement, before the tool is brought against the stop. In this case, the tool can be brought against a measuring stop in a measuring device which is independent of the tool chuck, the, in particular axial, distance of the characteristic element from the measuring stop or from a reference point then being determined. From this distance and the known axial desired position in the tool chuck, the position of the stop in the tool chuck can be calculated in a simple manner, this position leading to the tool being positioned in the axial desired position. The stop can be moved from, for example, a basic position into the pre-positioning position by the pre-positioning distance, the tool not yet touching the stop, but still being retained outside the tool chuck. In this way, the measurement for the pre-positioning takes place outside the chuck, so that the subsequent positioning can take place very quickly and very precisely in the heated tool chuck.

If the characteristic element is to be measured in the heated tool chuck, the measurement must be carried out very quickly. A quick measurement can be achieved if the tool is brought in front of an optical measuring system before the insertion, and the optical measuring system is focused on the characteristic element. In this way, time can be saved during the subsequent focusing.

The tool is expediently moved in such a way that the optical measuring system can be focused on the characteristic element. In the process, the tool is turned, for example, until the characteristic element comes to lie as effectively as possible in front of the optical measuring system. A quick and exact measurement can be ensured as a result.

The measurement can be speeded up again by the optical measuring system remaining focused on the characteristic element during the insertion. The optical measuring system tracks the movement of the characteristic element during the insertion operation and is already focused on the characteristic element when the tool strikes the stop. In this state, the measurement can be carried out very quickly and exactly.

Striking of the tool against the stop is advantageously recorded by an evaluating unit, and after that the determination of the position of the characteristic element is triggered. The determination of the position of the characteristic element can start the moment the tool comes to bear against the stop. When the striking is recorded, for example by a sensor, and the determination of position is subsequently triggered, the measurement can be carried out very quickly.

The striking of the tool against the stop can be reliably recorded if the recording is effected by means of the optical measuring system. No additional components, such as a sensor for example, are required. The recording can be achieved by the position of the characteristic element being followed in an image area during the insertion and by the position of the characteristic element in the image area being monitored for a predetermined displacement.

In a further configuration of the invention, the fixing of the tool in the tool chuck is released, and the stop moves the tool out of the tool chuck. A tool fixed in the tool chuck is subjected to high mechanical stresses during a machining operation on a workpiece. In the process, the tool can be shortened by wear or damage or by parts of the tool breaking off. It may only be possible to remove a shortened tool from the tool chuck with difficulty, or possibly it can no longer be removed at all. If the tool is pushed out by the stop, part of the tool protrudes from the tool chuck. At least this part of the tool can be gripped, so that the tool can be removed from the tool chuck. It is possible to remove the tool from the tool chuck in a reliable manner.

In an expedient configuration of the invention, the stop moves the tool out of the tool chuck up to a predetermined position of the stop. This position is advantageously selected in such a way that the tool projects from the tool chuck to such an extent that it can easily be removed and the tool at the same time is still sufficiently retained in the tool chuck so that it does not fall out of the tool chuck by itself. Reliable and faultless removal of the tool from the tool chuck can be ensured.

BRIEF DESCRIPTION OF THE DRAWINGS

Further advantages follow from the description of the drawing below. An exemplary embodiment of the invention is shown in the drawing. The drawing, the description and the claims contain numerous features in combination. The person skilled in the art will also expediently consider the features individually and form appropriate further combinations therefrom.

In the drawings.

DETAILED DESCRIPTION OF THE PREFERRED EMBODIMENTS

Figure 1:
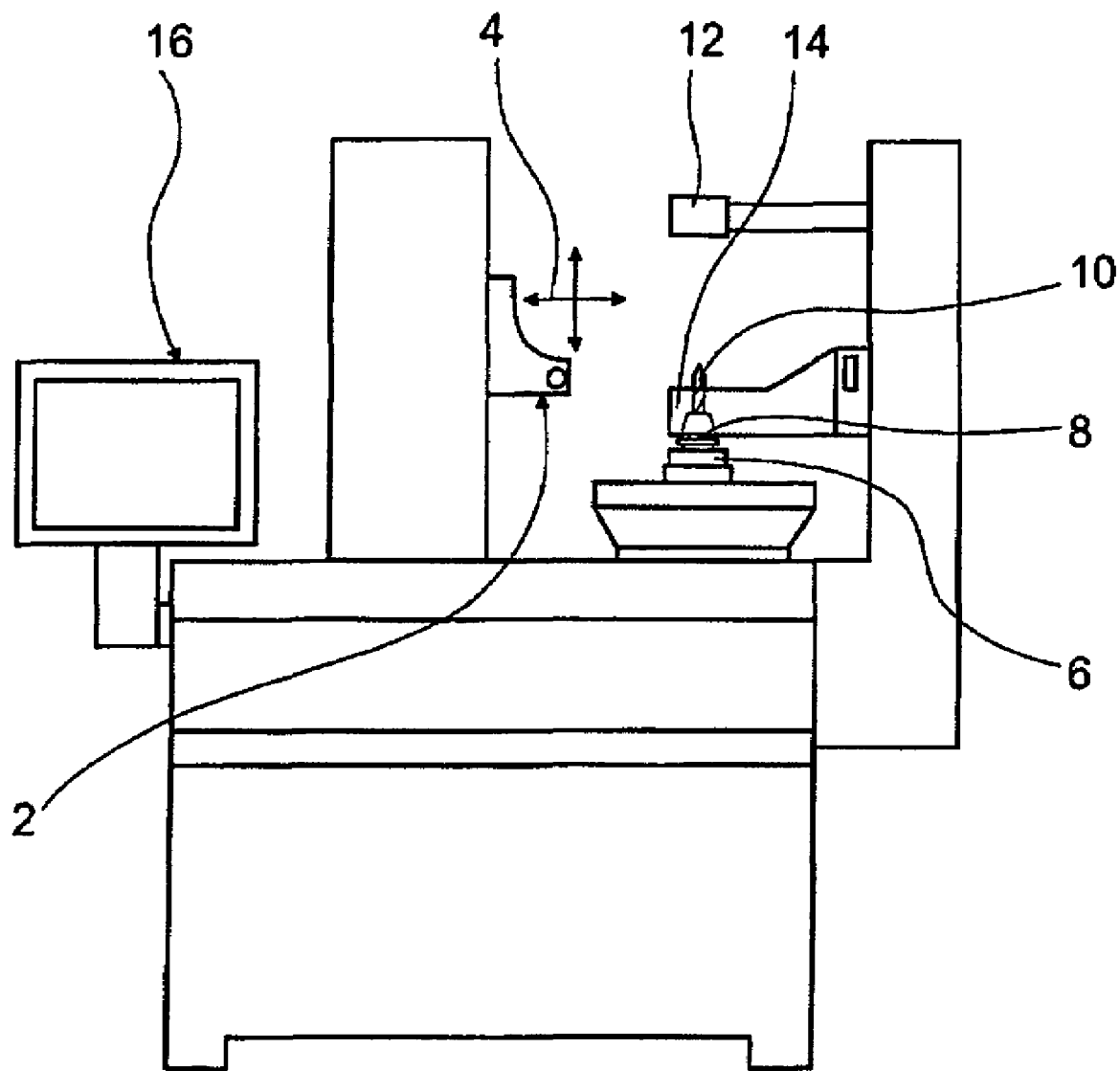
FIG. 1 shows a schematic illustration of a tool setting and measuring apparatus with a tool chuck.

The tool setting and measuring apparatus shown in FIG. 1 has an optical measuring system 2 for optically measuring tool parameters. The optical measuring system 2 is movable in the directions 4 indicated by the arrows. In addition, the tool setting and measuring apparatus comprises a rotatably designed tool chuck receptacle 6 for accommodating a tool chuck 8, which may be designed as a shrink fit chuck or as a tool chuck of a different kind. A tool 10 is inserted into the tool chuck 8. Furthermore, the tool setting and measuring apparatus has a heating device 12, with which the tool chuck 8 can be heated. Furthermore, there is also a gripping element 14, which is designed for the fully automatic insertion of the tool 10 into the tool chuck 8. Measured values determined by the optical measuring system 2, such as the position of a tool cutting lip for example, can be stored and retrieved by means of a data processing system 16.

Figure 2:
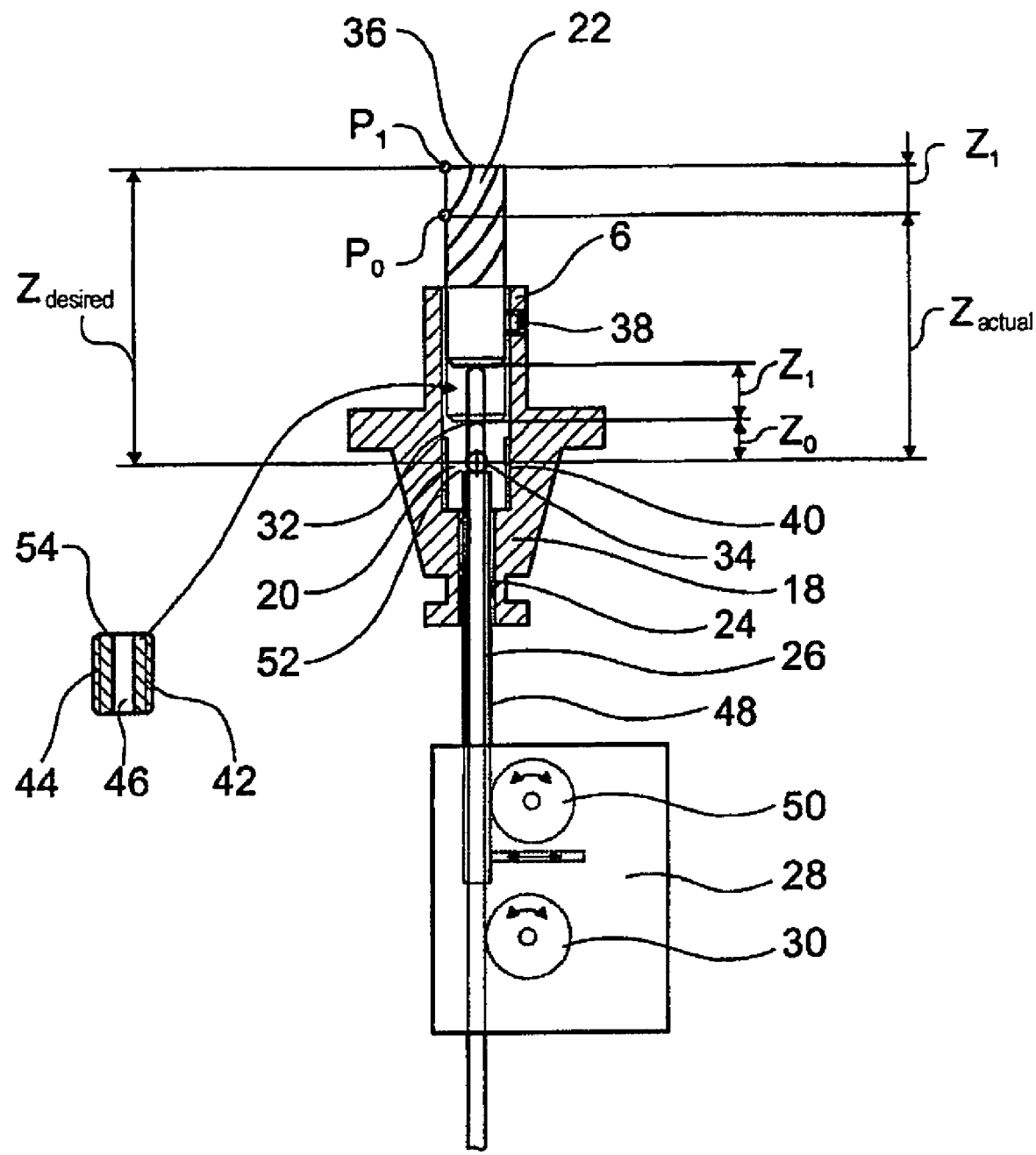
FIG. 2 shows a section through a tool chuck with a movable stop, in a schematic illustration.

FIG. 2 shows a section through a tool chuck 18 for inserting into the tool receptacle 6 from FIG. 1. The tool chuck 18 has a locating bore 20, into which a tool 22 can be inserted. There is a stop bore 24 below the locating bore 20, a movable stop 26 being passed through this stop bore 24. The stop 26 is held in a readjusting unit 28 having a readjusting drive 30. The stop 26 can be moved up and down by the readjusting drive 30.

To fix the tool 22, which is designed as a shank-type tool, in the tool chuck 18, the stop 26 is brought into a basic position. In the basic position, the tip 32 of the stop 26 is positioned at the distance $Z_0$ from a reference point 34. The reference point 34 may be marked on the tool chuck 18 as a point which can be detected and measured by the optical measuring system 2. Once the stop 26 has been brought into its basic position, the tool 22 is inserted into the locating bore 20. The insertion may be effected manually or automatically by the gripping element 14. The tool 22 comes to lie with its bottom shank end on the tip 32 of the stop 26. The edge of a cutting lip 36 serving as characteristic element of the tool 22 is then measured for its position by the optical measuring system 2. In the process, the distance $Z_{actual}$ of the edge or the cutting lip 36 from the reference point 34 is determined by the optical measuring system 2 being focused on the cutting lip 36 and by the position of the cutting lip 36 being compared with the stored position of the reference point 34. The distance $Z_{actual}$ is then compared with the distance $Z_{desired}$, which is that distance of the cutting lip 36 from the reference point 34 that is required in order to be positioned in the axial desired position. The measured values of the optical measuring system 2 are evaluated in the data processing system 16, in which the difference between the distances $Z_{actual}$ and $Z_{desired}$ is also calculated. The difference between the distances is the positioning distance $Z_1$.

The readjusting drive 30 of the readjusting unit 28 is now activated by the data processing system 16 in such a way that the stop 26 is moved upward by the positioning distance $Z_1$ by means of the readjusting drive 30. In the process, the tool 18 is moved slightly out of the tool chuck 18 by the movement of the stop 26. The edge of the cutting lip 36 moves from point $P_0$ to point $P_1$. The tool 18 is now positioned in its desired position in the tool chuck and can be fixed there. The fixing is effected by means of a clamping screw 38 which is arranged in the tool chuck 18. The tool 22 is clamped in place in the locating bore 20 by turning the clamping screw 38.

The desired position or the distance $Z_{desired}$ can now be checked by an automatic or manual measuring sequence with the optical measuring system 2. If the distance of the cutting lip 36 from the reference point 34 is outside the fixed tolerance band around $Z_{desired}$, the setting operation can be repeated by the clamping screw 38 being released once again and by the setting operation being started again.

A supporting means, or supporting structure, 40 in the form of an internal thread is inserted in the locating bore 20. Supported on this internal thread is a retaining stop 42, which is screwed with its external thread 44 in the internal thread. For the sake of clarity, the retaining stop 42 is not depicted in the locating bore 20 in FIG. 2, but is shown outside the tool chuck 18. Incorporated in the stop 42 is a passage 46, through which the stop 26 is passed. At least at its bottom end, the passage 46 has a hexagonal cross section, into which an adjusting tool 48 can be inserted. The adjusting tool 48 is arranged around the stop 26 over part of the length of the latter and can both be moved up and down and rotated about the longitudinal axis by an adjusting drive 50. Just like the bottom part of the passage 46, the tip 52 of the adjusting tool 48 is designed to be hexagonal, to be precise in such a way that the tip 52 can engage in the passage 46. Once the tool 22 has been fixed in its desired position, the adjusting tool 48 is moved and rotated by means of the adjusting drive 50 in such a way that the retaining stop 42 is screwed upward until the top surface 54 touches the bottom end of the shank of the tool 22. The touching can be detected by a sensor (not shown in FIG. 2). The retaining stop 42 provides the tool 22 with especially good retention against undesirable slipping into the locating bore 20 in the event of very intense loading during a machining operation. It is equally possible to manually bring the retaining stop 42 into contact with the bottom end of the tool shank by means of a hexagon key.

Figure 3:
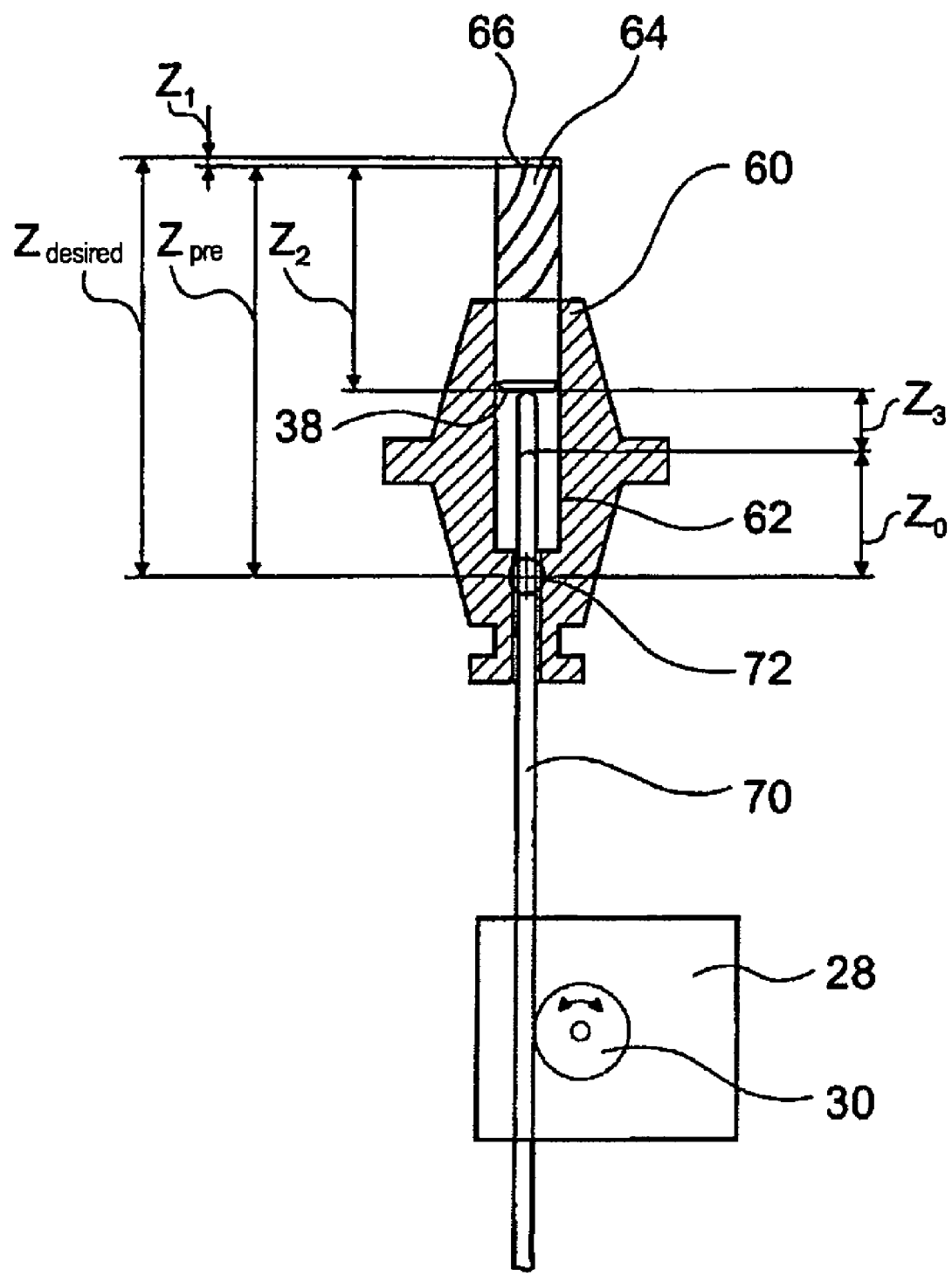
FIG. 3 shows a likewise schematically illustrated section through another tool chuck with a movable stop.

FIG. 3 shows a tool chuck 60 which is designed as a shrink fit chuck. Just like the tool chuck 18 from FIG. 2, the tool chuck 60 is also designed to be inserted and if need be clamped in place in the tool chuck receptacle 6. The tool chuck 60 has a locating bore 62 for receiving a tool 64. To fix the tool 64 in the tool chuck 60, the tool 64 is measured for its length $Z_2$ in a measuring device which is not shown in the figures. The length measurement may be effected by the optical measuring system 2 or by another optical measuring system. In the process, the tool 64 can be put with its shank end onto a measuring stop having a stop tip, the position of which is known. The distance of a cutting lip 66 from the position of the stop tip is then measured. By means of the length $Z_2$ obtained from the measurement, a pre-positioning distance $Z_3$ by which a stop 70 is moved upward from a basic position which is at a distance $Z_0$ from a reference point 72 is calculated. To fix the tool 64 in the chuck body 60, the tool chuck 60 is now heated by means of the heating device 12 of the tool setting and measuring apparatus. In the process, the locating bore 62 expands, so that the cool tool 64 can be inserted with its shank into the locating bore 62 and brought against the stop 70. The tool chuck 60 is then cooled, contracts and frictionally clamps the shank of the tool 64 in place. The cutting lip 66 is now located in a pre-position, which is at the distance $Z_{pre}$ from the reference point 72. Although this pre-position should theoretically correspond to the desired position, it may lie next to the desired position on account of inaccuracies within a range of a few 0.01 mm.

Once the tool 64 has been shrunk in place in the tool chuck, the position of the cutting lip 66 serving as a characteristic element is measured by means of the optical measuring system 2. In the process, the distance of the pre-position from the desired position of the cutting lip 66 is detected. This difference corresponds to the positioning distance $Z_1$, which is stored in the data processing system 16. The heating device 12 is now placed around the tool chuck 60 once again, and the tool chuck 60 is heated. The locating bore 62 expands and the tool 64 is loosened again. Once the temperature of the tool chuck 60 has reached a desired temperature, the stop 70 is moved by the positioning distance $Z_1$, so that the tool 64 reaches its desired position, at which the cutting lip 66 is at the distance $Z_{desired}$ from the reference point 72. The cutting lip 66 is now positioned in the desired position with an accuracy of one or more μm. After cooling of the tool chuck 60, the tool 64 is fixed in the locating bore 62 in the desired position with very high accuracy.

In a somewhat more complicated but quicker manner, the tool 64 can also be fixed in the desired position in the tool chuck 60 without pre-positioning. For this purpose, the tool 64, after it has been measured for its length $Z_2$ and before it is inserted into the locating bore 62 of the tool chuck 60, is held at a short distance above the tool chuck 60 by the gripping element 14. The tool 64 is now rotated until the cutting lip 66 or an edge of the cutting lip 66 is effectively arranged in the field of view of the optical measuring system 2, so that the optical measuring system 2 can focus on the cutting lip 66 or the edge. Once the focusing has been successfully completed, the tool 64 is inserted into the locating bore 62 of the heated tool chuck 60 by the gripping element 14. In the process, the tool 64 is moved in such a way that the optical measuring system 2 is carried along synchronously with the tool 64 and remains focused on the cutting lip 66 or edge. The striking of the tool 64 against the stop 70 on the tip thereof, the stop 70 being pre-positioned to the length of the tool 64, can be recorded by the cutting lip 66 arranged in the field of view of the optical measuring system 2 being moved slightly relative to the center point of the field of view, because the tool 64 stops at the stop 70, whereas the optical measuring system 2 still travels downward by a short distance. This difference in movement is recorded by the data processing system 16, and the exact defining of the position of the cutting lip 66 is triggered, from the measured result of which the distance $Z_1$ for correcting the pre-position to the desired position is determined. Accordingly, the stop 70 is then moved and the tool is brought into the desired position with very high accuracy.

Once the tools 22, 64—irrespective of which of the methods described above is used—have been shrunk in the desired position in the tool chuck 18, 60, the tool chuck 18, 60 together with the tool 22, 64 is fed to a cooling device which cools the tool chuck 18, 60. The tool 22, 64 is then fed to a machining apparatus, for example a CNC machine tool. If the tool 22, 64 should break during the machining operation, it may be the case that the tool 22, 64 can no longer be gripped by the gripping element 14 of the tool setting and measuring apparatus. To remove the tool 22, 64 from the locating bore 20, 62, the tool chuck 18, 60 is heated by the heating device 12, as a result of which the fixing of the tool 22, 64 in the tool chuck 18, 60 is released. The data processing system 16 now controls the readjusting drive 30 of the readjusting unit 28 in such a way that the stop 42, 70 is moved up to a predetermined position of the stop 42, 70. The predetermined position of the stop 42, 70 is selected in such a way that the broken tool 22, 64 projects from the tool chuck 18, 60 to a sufficient extent, so that it can be gripped by the gripping element 14 or can be removed effortlessly from the tool chuck 18, 60 by hand. In addition, the tool 22, 64 still remains in the locating bore 20, 62 to a sufficient extent, so that it does not fall out of the locating bore 20, 62.

LIST OF DESIGNATIONS

2 Optical measuring system
4 Direction
6 Tool chuck receptacle
8 Tool chuck
10 Tool
12 Heating device
14 Gripping element
16 Data processing system
18 Tool chuck
20 Locating bore
22 Tool
24 Stop bore
26 Stop
28 Readjusting unit
30 Readjusting drive
32 Tip
34 Reference point
36 Cutting lip
38 Clamping screw
40 Supporting means
42 Stop
44 External thread
46 Passage
48 Adjusting tool
50 Adjusting drive
52 Tip
54 Surface
60 Tool chuck
62 Locating bore
64 Tool
66 Cutting lip
68 Shank end
70 Stop
72 Reference point
$Z_0$ Distance
$Z_1$ Positioning distance
$Z_2$ Length
$Z_3$ Pre-positioning distance
$Z_{actual}$ Distance
$Z_{desired}$ Distance
$Z_{pre}$ Distance
$P_0$ Point
$P_1$ Point

The invention claimed is:

1. A method for fixing a tool having a shank in a tool chuck in comprising:
    inserting the tool into the tool chuck;
    fixing the tool in the tool chuck when an axial desired position is reached;
    positioning the tool with its shank against a stop and measuring a position of a characteristic element of the tool to obtain a measurement; and
    positioning the tool in the axial desired position by a movement of the stop by a positioning distance calculated from the measurement,
    wherein a cutting lip of the tool is used as characteristic element.

2. The method as claimed in claim 1, wherein the tool is brought against the stop after the insertion.

3. The method as claimed in claim 1, wherein the tool is moved out of the tool chuck by the movement of the stop.

4. The method as claimed in claim 1, wherein an actual distance of the characteristic element from a reference point is determined, and the positioning distance is calculated from the difference between the actual distance and a desired distance.

5. The method as claimed in claim 1, wherein the tool is shrunk in place in the tool chuck after reaching the desired position.

6. The method as claimed in claim 1, wherein the tool is inserted, pre-positioned and shrunk in place in the tool chuck and is loosened again before the movement of the stop by the positioning distance.

7. The method as claimed in claim 1, wherein the tool is brought in front of an optical measuring system before the insertion, and the optical measuring system is focused on the characteristic element.

8. The method as claimed in claim 7, wherein the tool is moved in such a way that the optical measuring system can be focused on the characteristic element.

9. The method as claimed in claim 7, wherein the optical measuring system remains focused on the characteristic element during the insertion.

10. The method as claimed in claim 1, wherein the fixing of the tool in the tool chuck is released, and the stop moves the tool out of the tool chuck.

11. The method as claimed in claim 10, wherein the tool is moved out of the tool chuck up to a predetermined position of the stop.

12. A method for fixing a tool having a shank in a tool chuck in comprising:
inserting the tool into the tool chuck;
fixing the tool in the tool chuck when an axial desired position is reached;
positioning the tool with its shank against a stop and measuring a position of a characteristic element of the tool to obtain a measurement; and
positioning the tool in the axial desired position by a movement of the stop by a positioning distance calculated from the measurement,
wherein a retaining stop supported in the tool chuck is brought against the tool, after the tool is in the desired position.

13. A method for fixing a tool having a shank in a tool chuck in comprising:
inserting the tool into the tool chuck;
fixing the tool in the tool chuck when an axial desired position is reached;
positioning the tool with its shank against a stop and measuring a position of a characteristic element of the tool to obtain a measurement; and
positioning the tool in the axial desired position by a movement of the stop by a positioning distance calculated from the measurement, wherein
the tool is inserted, pre-positioned, and shrunk in place in the tool chuck and is loosened again before the movement of the stop by the positioning distance, and
before the insertion, the characteristic element of the tool is measured for its position relative to a stop point at the tool to obtain a length, and the stop is moved by a positioning distance calculated from the length, before the tool is brought against the stop.

14. A method for fixing a tool having a shank in a tool chuck in comprising:
inserting the tool into the tool chuck;
fixing the tool in the tool chuck when an axial desired position is reached;
positioning the tool with its shank against a stop and measuring a position of a characteristic element of the tool to obtain a measurement; and
positioning the tool in the axial desired position by a movement of the stop by a positioning distance calculated from the measurement,
wherein striking of the tool against the stop is recorded by a data processing system, and after that the determination of the position of the characteristic element is triggered.

15. The method as claimed in claim 14, wherein the recording is effected by an optical measuring system.

* * * * *